United States Patent [19]

Thielen et al.

[11] Patent Number: 4,796,718
[45] Date of Patent: Jan. 10, 1989

[54] DRIVE SLIP CONTROL SYSTEM FOR A MOTOR VEHICLE

[76] Inventors: Christoph Thielen, Wiesenstr. 2, 3423 Bad Sachsa; Franz Nagler, Am Zehntgrafen 12, D-8729 Gädheim/Ottendorf, both of Fed. Rep. of Germany

[21] Appl. No.: 891,255

[22] Filed: Jul. 28, 1986

[30] Foreign Application Priority Data

Aug. 7, 1985 [DE] Fed. Rep. of Germany ....... 3528389

[51] Int. Cl.$^4$ ...................... B60K 23/00; B60K 28/00; B60K 31/00
[52] U.S. Cl. ..................................... 180/197; 180/249; 192/0.052; 192/0.075; 192/0.076; 364/424.1
[58] Field of Search ............... 180/197, 233, 247, 248, 180/249, 250; 74/866; 364/424.1, 426; 192/0.052, 0.075, 0.076

[56] References Cited

U.S. PATENT DOCUMENTS

| | | | |
|---|---|---|---|
| 4,473,143 | 9/1984 | Windsor | 192/0.076 X |
| 4,476,953 | 10/1984 | Hiraiwa | 180/249 |
| 4,484,653 | 11/1984 | Horikoshi et al. | 180/197 X |
| 4,552,241 | 11/1985 | Suzuki | 180/249 |
| 4,562,541 | 12/1985 | Sakakiyama | 180/233 X |
| 4,566,554 | 1/1986 | Suzuki | 180/249 |
| 4,601,359 | 7/1986 | Weismann et al. | 180/248 X |
| 4,605,087 | 8/1986 | Ashauer et al. | 180/248 |
| 4,671,373 | 6/1987 | Sigl | 180/197 |
| 4,682,667 | 7/1987 | Hosaka | 180/197 |

FOREIGN PATENT DOCUMENTS

| | | | |
|---|---|---|---|
| 191827 | 9/1985 | Japan | 180/249 |
| 223907 | 8/1925 | United Kingdom . | |
| 989119 | 4/1965 | United Kingdom . | |
| 2163511 | 8/1984 | United Kingdom . | |
| 2140104 | 11/1984 | United Kingdom | 180/249 |

Primary Examiner—John J. Love
Assistant Examiner—Mitchell J. Hill

[57] ABSTRACT

For the control of the drive slip of a motor vehicle a first rotation rate sensor produces a first rotation rate signal corresponding to the rotation rate of the driven wheel or the output rotation rate of the change-speed gear. A second rotation rate sensor generates a second rotation rate signal corresponding to the rotation rate of a non-driven wheel. The friction clutch of the motor vehicle is engageable and disengageable through a controllable servo drive, and a control system controls the clutch in the release direction when the first rotation rate signal represents a rotation rate higher by at least a pre-determined difference value than the second rotation rate signal. The control system controls the clutch in the engagement direction when the rotation rates represented by the first and the second rotation rate signals differ by less than the pre-determined difference value. In order that the drive slip may be controlled even in movement-starting situations in which one of the drive wheels is stationary, a controllable blocking differential gear can be provided. The rotation rate of the internal combustion engine is controlled by a control system so that it does not exceed a pre-determined rotation rate value during the occurrence of the drive slip condition.

6 Claims, 1 Drawing Sheet

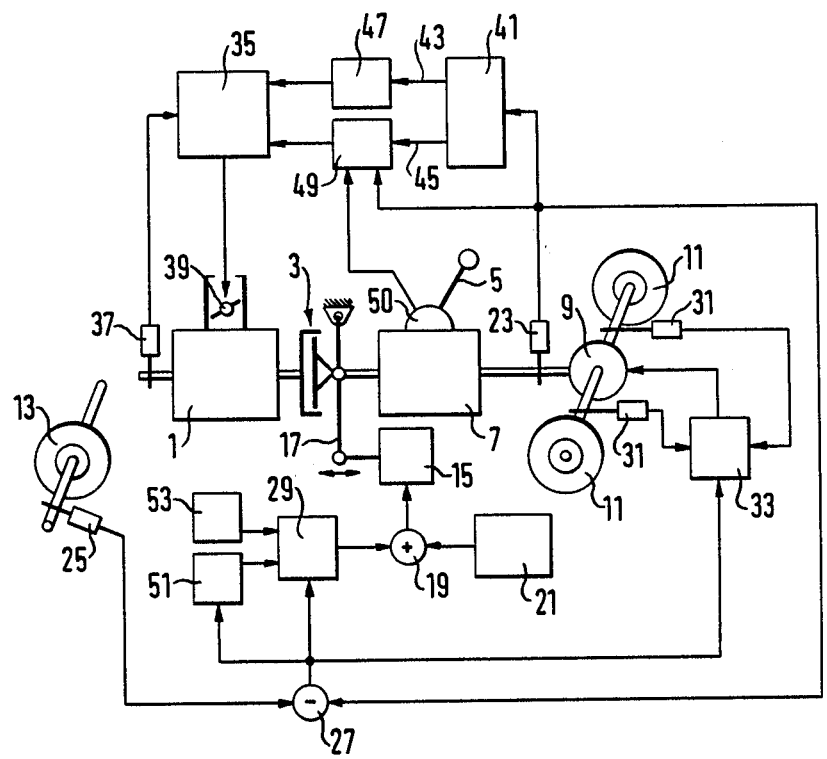

DRIVE SLIP CONTROL SYSTEM FOR A MOTOR VEHICLE

BACKGROUND OF THE INVENTION

The invention relates to a system for controlling the drive slip of a motor vehicle driven wheel driven through a clutch by an internal combustion engine.

It is known to control the drive slip of the driven wheels of a motor vehicle in that the rotation rate of the driven wheels is detected by first rotation rate sensors and the rotation rate of a non-driven wheel is detected by a second rotation rate sensor. The brakes of the driven wheels are provided with brake pressure setting elements which, under the control of a control circuit, reduce the drive force of each of the driven wheels independently by braking the wheel. In order to prevent both the driven wheels, coupled with one another through a differential gear, from being braked at the same time if both driven wheels are slipping, the control circuit reduces the engine power output through a servo throttle valve in this operational situation.

With respect to prior art systems of this type, the invention provides a system for controlling the drive slip of driven wheels of a motor vehicle in which it is not necessary to brake the slipping driven wheel.

SUMMARY OF THE INVENTION

According to the invention, for controlling the drive slip the drive torque acting upon the driven wheels is reduced in that the clutch arranged in the force-transmission path between the internal combustion engine and the gearing is disengaged by means of a controllable drive system so far that a pre-determined slip of preferably less than 5% on time average, for example 1 to 2%, is not exceeded. To control the clutch a torque-setting arrangement is used which shifts the clutch in the release direction with a pre-determined setting speed if the momentary rotation rate or angular speed of the driven wheel monitored by a first rotation rate sensor is higher by a pre-determined difference value than the momentary rotation rate or angular speed of the non-driven wheel monitored by a second rotation rate sensor. The clutch is controlled in the engagement direction when the rotation rates differ by less than the pre-determined difference value.

In the case of motor vehicles having driven wheels driven in pairs through a differential gear, measures must be taken to be able to control the drive slip of only one of the two driven wheels. For this purpose in a preferred embodiment a controllable blocking differential is provided which is blocked in the case of drive slip of only one of the two driven wheels. Relative rotations of the two driven wheels coupled with one another through the blocking differential gear are detected by a third rotation rate sensor in relation to the rotation rate signal of the first rotation rate sensor and exploited to control the blocking differential gear. In this connection it has proved expedient if the first rotation rate sensor detects the input rotation rate of the blocking differential gear and is used at the same time as signal emitter for the vehicle tachometer.

The blocking differential gear as explained above is activated in dependence upon the presence of a drive slip condition so that the function of the differential gear is not unnecessarily impaired in driving around bends. However the blocking differential gear is not necessary if only the drive slip is to be corrected during driving, for example in order to reduce the tendency of the motor vehicle to skid when driven wheels spin on one side, for example in aquaplaning or on slippery ice, by reducing the total drive power output of the motor vehicle. The reduction of the drive torque acting upon the driven wheels by partial release of the clutch increases the thermal loading of the clutch. In order to prevent overloading of the clutch, in a preferred embodiment on the occurrence of drive slip conditions the engine power output is additionally limited in dependence upon the engine rotation rate. The rotation rate limit value in turn is selected in dependence upon the driving conditions. In starting movement the engine power output is expediently so regulated that the rotation rate at which the internal combustion engine generates 80% of its maximum torque is not exceeded. During driving the engine rotation rate is so limited by regulation of the engine power output that under the release conditions of the slip control the synchronous rate of the clutch, that is the momentary rotation rate of the input shaft of the change-speed gear, is not exceeded. The engine rotation rate is preferably regulated to the value of the synchronous rotation rate.

A further preferred measure for protecting the clutch against overload consists in that the duration of time within which the clutch is partially released for drive slip, regulation is limited to a maximum time period and after the elapse of the maximum time period the clutch is positively engaged, even if drive slip conditions are present.

The drive slip control system according to the invention is especially suitable for motor vehicles with automatically controlled friction clutch, in which the clutch is in any case engaged and disengaged by means of a controllable servo-drive system. The servo-drive system is expediently a closed loop positional servo-drive system in which the releaser position is controlled by a position ideal value signal delivered by the automatic clutch actuation device. Then a correction signal for the regulation of the drive slip can be superimposed upon this position ideal value signal.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing shows a diagrammatic block circuit diagram of a system for controlling the drive slip of a motor vehicle.

DETAIL DESCRIPTION OF THE DRAWING

The motor vehicle comprises an internal combustion engine 1 which is connected through a friction clutch 3 with a multi-ratio change-speed gear, here a change-speed gear 7 manually shiftable by means of a gear-change lever 5. The change-speed gear 7 drives a pair of driven wheels 11 through a controllable blocking differential gear 9. One of the non-driven wheels of the motor vehicle is represented at 13. The friction clutch 3 is engaged and disengaged by a position servo-drive system 15 which can adjust a releaser 17 of the friction clutch 3 to a position determined by a position ideal value signal. The position ideal value signal is fed to the position servo-drive system 15 through a summation stage 19 from a clutch control 21 which controls the clutch position in dependence upon working parameters of the vehicle, for example the rotation rate of the internal combustion engine 1, the position of an accelerator pedal (not further illustrated), the position of the gear-change lever 5 or the driving speed of the vehicle. A suitable clutch control system is described by way of example in Fed. German Publication Specification No. 3,028,250. On touching of the gear-change lever 5 and release of the accelerator pedal the clutch control system 21 releases the friction clutch 3 so that the gear can be changed. On subsequent actuation of the accelerator pedal the clutch is reengaged in dependence upon the engine rotation rate or in time dependence.

In order that the drive slip of the drive wheels 11 may be regulated, one rotation rate sensor 23, which may be the signal emitter of the vehicle tachometer, detects the output rotation rate of the change-speed gear 7. Another rotation rate sensor 25 detects the rotation rate of the non-driven wheel 13. A subtraction stage 27 forms a difference signal of the rotation rate signals generated by the rotation rate sensors 23, 25, which is a measure for the momentary difference of the rotation rate of the non-driven wheel 13 and the output rotation rate of the change-speed gear 7. In the summation stage 19 a control system 29 superimposes upon the position ideal value signal of the clutch control system 21 a correction signal which disengages the friction clutch 3, starting from the releaser position determined by the position ideal value signal of the clutch control system 21, so far that the drive slip of the drive wheels 11 is prevented. The control system 29 is a constituent of a closed loop regulating circuit which compares the difference signal of the subtraction stage 27 with a pre-determined slip value of preferably 1 to 2% of the rotation rate detected by the rotation rate sensor 23. If the slip exceeds this value, the friction clutch 3 is controlled in the release direction; if the slip falls short of the pre-determined value, the friction clutch 3 is adjusted in the engagement direction.

The friction clutch 3 reduces the drive torque acting through the blocking differential gear 9 upon the driven wheels 11 down to a value at which the increase of the output rotation rate of the change-speed gear 7, effected by the slip of one of the two driven wheels 11, is eliminated. In this way in driving operation it is possible to prevent drive slip such as occurs for example if only one of the two driven wheels comes on to smooth ice or wet roadway.

In starting movement on ice and snow or the like the case can occur where one of the two driven wheels 11 spins while the other driven wheel remains still by reason of the nature of the ground. Two rotation rate sensors 31, allocated to the two driven wheels 11, detect this driving situation and block the controllable blocking differential gear 9, through a control stage 33. The control stage 33 can be activatable additionally through a difference signal of the subtraction stage 27, representing a drive slip condition, for the blocking of the blocking differential gear 9. If the drive slip control is to be effective only in driving operation, a blocking differential becomes superfluous, so that a conventional, non-blocking differential gear can be used for the drive of the driven wheels 11.

The drive slip control system ensures an overload protection of the friction clutch 3. A motor power output regulating circuit 35 detects the rotation rate of the internal combustion engine 1 by means of a rotation rate sensor 37 and regulates the engine power output for example through the ignition, but preferably a power setting element, such for example as a throttle valve 39, so that the engine rotation rate does not exceed a pre-determined rotation rate value. The pre-determined rotation rate value is given in dependence upon the operating situation of the vehicle. For this purpose to the rotation rate sensor 23 which detects the output rotation rate of the change-speed gear 7 there is connected a comparator stage 41 which generates a first control signal at rotation rates which substantially correspond to the stationary condition of the vehicle, at an output 43, and a second control signal at rotation rates which occur substantially in driving operation, at an output 45. The control signal occurring at the output 43 when the vehicle is stationary is generated in the starting of movement of the vehicle and liberates an ideal value emitter 47 which controls the regulating circuit 35 so that the engine rotation rate does not exceed a constant first rotation rate value $n_{max}$. The rotation rate value $n_{max}$ lies in a rotation rate range in which the internal combustion engine 1 reaches 75% to 85%, preferably about 80%, of the maximum engine torque. In driving situations the ideal value emitter 47 is ineffective and the pre-determined rotation rate value to which the regulating circuit 35 limits the engine rotation rate is fixed by an ideal value emitter 49 which can be activated by the control signal of the output 45. The ideal value emitter 49 comprises a calculator circuit which calculates an ideal value signal corresponding to the input rotation rate of the change-speed gear 7 providing a second rotation rate value from the rotation rate signal of the rotation rate sensor 23 and a control signal of an emitter 50 which detects the position of the change-speed lever 5. The input rotation rate of the change-speed gear 7 is equal in driving operation to the synchronous rotation rate of the friction clutch 3, that is to say that rotation rate at which the internal combustion engine 1 must work in order to avoid rotation rate differences on the released friction clutch 3. In driving operation the engine rotation rate will preferably be kept constantly at the synchronous rotation rate on the occurrence of drive slip conditions.

As further measure to protect the friction clutch 3 against overloading a time stage 51 is provided which is triggered for example by the difference signal of the subtraction stage 27, which represents the occurrence of the drive slip condition, and switches the control system 29 to ineffectiveness after the elapse of a pre-determined time period. The pre-determined time period is dimensioned so that within this time period no overheating damage can occur to the slipping, partially released friction clutch 3.

The control system 29 can further be switched on and off through a control stage 53, that is activated according to choice. The control stage 53 can be a switch provided for example on the dashboard of the motor vehicle. The control stage 53 can however also automatically switch the drive slip regulating system to effectiveness in dependence upon other parameters, for example in dependence upon the external temperature through an ice-warning device, or in dependence upon the accelerator pedal position.

In the present embodiment the occurrence of the drive slip condition is ascertained in dependence upon the output rotation rate of the change-speed gear 7. In place of the rotation rate sensor 23 however it is also possible for one or possibly both of the rotation rate sensors 31 to be connected with the subtraction stage 27 and/or the control system 29.

While a specific embodiment of the invention has been shown and described in detail to illustrate the application of the inventive priciples, it will be understood that the invention may be embodied otherwise without departing from such principles.

What we claim is:

1. A system for controlling the drive slip of a motor vehicle driven wheel driven by an internal combustion engine through a change-speed gear having multiple gear settings and a friction clutch arranged in a torque transmission path between the internal combustion engine and the change-speed gear, comprising
   (a) a first rotation rate sensor which generates a first rotation rate signal corresponding to the rotation rate of the driven wheel,
   (b) a second rotation rate sensor which generates a second rotation rate signal corresponding to the rotation rate of a non-driven wheel of the motor vehicle,
   (c) a controllable servo-drive means for engaging and disengaging the clutch and
   (d) means responsive to the first and second rotation rate signals for controlling the servo-drive means of the clutch for displacing the clutch in a clutch release direction when the first rotation rate signal represents a rotation rate higher by at least a pre-determined difference from the rotation rate represented by the second rotation rate signal, and for displacing the clutch in a clutch engagement direction when the rotation rates represented by the first and the second rotation rate signal differ by less than the pre-determined difference.

2. A system according to claim 1, wherein said difference amounts to less than 5% of the rotation rate represented by the first rotation rate signal.

3. A system according to claim 1, wherein an engine rotation rate sensor generates an engine rotation rate signal corresponding to the rotation rate of the internal combustion engine, wherein a power output limiting arrangement responding to the engine rotation rate signal controls the power output of the internal combustion engine during the regulation of the drive slip in such a way that the rotation rate of the internal combustion engine does not exceed a pre-determined rotation rate value, and wherein a control circuit responding to at least one of the rotation rate signals and a control signal representing the gear setting of the change-speed gear sets the magnitude of the pre-determined rotation rate value to a constant first rotation rate value in the starting of movement of the motor vehicle and to a second rotation rate value varying substantially according to the input rotation rate of the change-speed gear on changing the gear-setting of the change-speed gear during driving.

4. A system according to claim 3, wherein the first rotation rate value lies in a rotation rate range in which the internal combustion engine delivers between 75% and 85% of its maximum torque.

5. A system according to claim 3, wherein the control circuit responds to the second rotation rate signal and sets the first rotation rate value if the value of the first rotation rate signal corresponds substantially to the stationary condition of the vehicle and otherwise sets the second rotation rate value.

6. The system according to claim 2, wherein said difference amounts to about 1 to 2% of the rotation rate represented by the first rotation rate signal.

* * * * *

UNITED STATES PATENT AND TRADEMARK OFFICE
CERTIFICATE OF CORRECTION

PATENT NO. : 4,796,718

DATED : January 10, 1989

INVENTOR(S) : Christoph Thielen et al

It is certified that error appears in the above-identified patent and that said Letters Patent is hereby corrected as shown below:

Title page:

[73] Assignee:-- Sachs-Systemtechnik GmbH, Fed. Rep. of Germany--

Signed and Sealed this

Third Day of October, 1989

Attest:

DONALD J. QUIGG

Attesting Officer

Commissioner of Patents and Trademarks